United States Patent
Wibben et al.

(10) Patent No.: US 9,774,257 B2
(45) Date of Patent: Sep. 26, 2017

(54) CONTROL CIRCUIT FOR A SWITCHING REGULATOR DRIVING AN LED LOAD WITH CONTROLLED PWM DIMMING

(71) Applicant: Allegro Microsystems, LLC, Worcester, MA (US)

(72) Inventors: Joshua Wibben, New Brighton, MN (US); Kurt Kimber, Minneapolis, MN (US); Peter Tod, Edinburgh (UA)

(73) Assignee: ALLEGRO MICROSYSTEMS, LLC, Worcester, MA (US)

( * ) Notice: Subject to any disclaimer, the term of this patent is extended or adjusted under 35 U.S.C. 154(b) by 72 days.

(21) Appl. No.: 14/620,656

(22) Filed: Feb. 12, 2015

(65) Prior Publication Data
US 2015/0340950 A1  Nov. 26, 2015

Related U.S. Application Data

(60) Provisional application No. 62/002,417, filed on May 23, 2014.

(51) Int. Cl.
*H02M 3/158* (2006.01)
*H05B 33/08* (2006.01)

(52) U.S. Cl.
CPC ........ *H02M 3/158* (2013.01); *H05B 33/0845* (2013.01); *H05B 33/0851* (2013.01)

(58) Field of Classification Search
CPC . H02M 2001/0003; H02M 2100/0025; H02M 3/156–3/1588
See application file for complete search history.

(56) References Cited

U.S. PATENT DOCUMENTS

| | | | |
|---|---|---|---|
| 5,264,782 A * | 11/1993 | Newton | H02M 1/36 323/222 |
| 6,982,527 B2 | 1/2006 | Lee et al. | |
| 7,675,245 B2 | 3/2010 | Szczeszynski et al. | |
| 7,999,487 B2 | 8/2011 | Szczeszynski | |
| 8,169,161 B2 | 5/2012 | Szczeszynski et al. | |
| 8,339,049 B2 | 12/2012 | Kang et al. | |
| 8,456,105 B2 | 6/2013 | Wang et al. | |
| 8,482,225 B2 | 7/2013 | Szczeszynski | |
| 8,519,630 B2 | 8/2013 | Wang et al. | |
| 8,610,371 B2 | 12/2013 | Lee et al. | |
| 8,664,930 B2 | 3/2014 | Kang et al. | |
| 8,742,682 B1 | 6/2014 | Wang et al. | |

(Continued)

FOREIGN PATENT DOCUMENTS

EP    2 723 146    4/2014

OTHER PUBLICATIONS

PCT Search Report and Written Opinion of the ISA dated Aug. 20, 2015; for PCT Pat. App. No. PCT/US2015/020057; 10 pages.

(Continued)

*Primary Examiner* — Harry Behm
*Assistant Examiner* — Peter Novak
(74) *Attorney, Agent, or Firm* — Daly, Crowley, Mofford & Durkee, LLP

(57) ABSTRACT

A switching regulator control circuit includes a circuit configured to generate a control signal to control conduction of the regulator switch in response to a reference signal that is ramped to control a rate of change of the regulated output of the regulator and the control signal is gated in response to a PWM signal.

13 Claims, 8 Drawing Sheets

(56) References Cited

U.S. PATENT DOCUMENTS

| | | | |
|---|---|---|---|
| 8,779,805 B1 | 7/2014 | Fernandez et al. | |
| 8,901,835 B2 | 12/2014 | Kang et al. | |
| 8,937,433 B1 | 1/2015 | Wang et al. | |
| 2007/0222739 A1* | 9/2007 | Yu | G09G 3/3406 345/102 |
| 2008/0084196 A1 | 4/2008 | Lacombe et al. | |
| 2010/0156382 A1* | 6/2010 | Gotoh | H02M 1/36 323/312 |
| 2010/0289424 A1 | 11/2010 | Chang et al. | |
| 2010/0308026 A1* | 12/2010 | Vogel | H02M 3/157 219/130.21 |
| 2012/0286687 A1 | 11/2012 | Kikuchi et al. | |
| 2013/0009556 A1 | 1/2013 | Szczeszynski et al. | |
| 2013/0009557 A1 | 1/2013 | Szczeszynski | |
| 2014/0084884 A1* | 3/2014 | Lee | H02M 3/157 323/271 |
| 2014/0217999 A1* | 8/2014 | Wibben | H02M 3/156 323/282 |
| 2014/0253072 A1* | 9/2014 | Hussien | H02M 1/36 323/281 |

OTHER PUBLICATIONS

Application as filed on Nov. 26, 2014 U.S. Appl. No. 14/554,396; 34 pages.
International Preliminary Report on Patentability dated Dec. 8, 2016 for PCT Application No. PCT/US2015/020057; 8 pages.

* cited by examiner

CONTROL CIRCUIT FOR A SWITCHING REGULATOR DRIVING AN LED LOAD WITH CONTROLLED PWM DIMMING

CROSS REFERENCE TO RELATED APPLICATIONS

This application claims the benefit of U.S. Provisional Application No. 62/002,417 filed May 23, 2014, and entitled "SWITCHING REGUALATOR CONTROL CIRCUIT" which application is incorporated herein by reference in its entirety.

STATEMENT REGARDING FEDERALLY SPONSORED RESEARCH

Not Applicable.

FIELD

This disclosure relates generally to switching regulators and, more particularly, to switching regulator control circuits.

BACKGROUND

Regulators, or converters, including a switch, sometimes referred to as a power switch, for transferring energy from an input, such as an AC or DC voltage or current source, to a regulated output are well known. In some regulators, sometimes referred to as switching regulators, the switch turns on and off to regulate the output. In other regulators, sometimes referred to as linear regulators, the switch operates in its active, or saturation region.

Common switching regulator configurations include Buck, Boost, Buck-Boost, flyback, SEPIC, Cúk, half bridge, and full bridge to name a few. As is also well known, various control methodologies for controlling conduction of the power switch can be applied to switching regulators, including Pulse Width Modulation (PWM) and Pulse Frequency Modulation (PFM), and for each of these control methodologies, various feedback and feed forward techniques are possible including voltage mode control and current mode control.

Switching regulators are often used to provide a regulated current to drive an LED load as may include one or multiple LEDs coupled in series and/or parallel. Such switching regulators control the intensity or brightness of the LEDs by selectively dimming the LEDs. In one type of LED dimming, sometimes referred to as analog dimming, the intensity of the LEDs is adjusted by adjusting the regulated LED current. Analog dimming may utilize an error amplifier which is responsive to a reference signal and to a feedback signal proportional to the regulator output to generate an error signal. The error signal is then used to generate a switch control signal to control conduction of the switch and the resulting regulated current. For example, the error signal may be compared to a ramp signal to generate the switch control signal with a duty cycle suitable for regulating the LED current at a desired level.

In another type of LED dimming, sometimes referred to as PWM dimming, the intensity of the LEDs is adjusted by turning them off and on in response to a PWM signal at a variable duty cycle with a fixed DC current and frequency (typically 100 Hz to 1 KHz). The PWM signal may be externally provided or internally generated.

For LEDs, often PWM dimming is preferred over analog dimming because it minimizes the color shift that can occur when using analog dimming. On the other hand, analog dimming can be less complicated to implement than PWM dimming and PWM dimming pulses the LED current, which can cause visible flicker, audible noise, or EMI issues.

FIG. 1 illustrates a Boost regulator driving an LED load with current mode control that permits both PWM dimming and analog dimming. Analog dimming is achieved by adjusting the reference of the error amplifier (I1) according to the voltage on an external pin. As illustrated in FIG. 1, the IREF pin is the external input that can be used to control the error amplifier reference when the voltage is below 1.0V. When the IREF pin voltage is greater than 1.0V, comparator I10 changes the state of analog multiplexer ("mux") I13, running the error amplifier off of the internal reference, which may be more accurate than the voltage supplied on the IREF pin. This feature is sometimes implemented by adding an additional positive input to the error amplifier (I1) that overrides the internal reference when the external signal is less than the internal reference.

For PWM dimming, the user controls the intensity of the LEDs by supplying a digital PWM signal into the PWM pin in FIG. 1. As noted, some LED regulators may include the generation of the PWM signal on chip, in which case the user supplies an analog signal that is translated into a PWM duty cycle. Referring also the illustrative waveforms of FIG. 2, when the PWM signal is low the SW node is tri-stated with AND gate I5 to cause the LED current to be disabled. In addition, many LED regulators also tri-state the COMP node by introducing switch SW1. This technique allows the control loop to quickly recover when the regulator is re-enabled on the PWM input rising edge. Without switch SW1 the error amplifier (I1) would have to slew the COMP node to resume operation.

To provide an even faster LED turn on and turn off, some regulators introduce a switch in series with the LEDs that is driven by the PWM input as illustrated by M2 in FIG. 1. Without M2, the turn off characteristic of the LED current would be exponential because the output capacitor (Cout) will continue to supply current to the LEDs until the dynamic resistance in the LEDs discharges Cout enough to turn off the diode component of the LEDs. The dynamic resistance in the LEDs causes the output capacitor to more slowly discharge, which results in the soft turn off characteristic and a small voltage ripple across the output capacitor. This soft turn off characteristic makes the relationship between the PWM pin duty cycle and the LED intensity non-linear, especially at low duty cycles. On the other hand, turning the LED current instantaneously on and off can cause EMI issues in some systems, since fast edges produce more harmonic noise further up in the frequency domain which can be difficult to attenuate. This issue is especially aggravated when there are wires between the LED driver and the LEDs, as shown in FIG. 1, because they act as an antenna for EMI emission.

SUMMARY

A switching regulator control circuit includes a circuit configured to generate a control signal to control conduction of the regulator switch in response to a reference signal that is ramped to control a rate of change (i.e., increase and/or decrease) of the regulated output of the regulator and the control signal is gated in response to a PWM signal. With this arrangement, in applications in which the regulated output is a regulated current to drive an LED load, the LED is dimmed in response to a PWM signal, but in conjunction with a controlled ramping the LED current in response to the reference signal. With the described circuitry and techniques, EMI and other issues caused by instantaneously turning on and off the switch are alleviated by slowly ramping the LED current up when turning on the LEDs and down when turning off the LEDs in a well controlled fashion. For example, the described arrangement reduces control loop overshoot when the LEDs are turned back on after dimming. The described circuits and methods reduce EMI while allowing for good low duty cycle performance.

Features may include one or more of the following. The LED current may be ramped down by delaying turning off the switch following a transition of the PWM signal. The delay may be established based on the reference signal crossing a predetermined threshold. The reference signal may be ramped at a rate established in part by a capacitor and/or at a user programmable rate. A soft start feature may be implemented. The ramping of the reference signal may be subject to a timeout feature. A second switch, coupled in series with the LED load, may be controlled by a linear regulator in response to the reference signal.

BRIEF DESCRIPTION OF THE DRAWINGS

The foregoing features of the disclosure, as well as the disclosure itself may be more fully understood from the following detailed description of the drawings, in which.

DETAILED DESCRIPTION

Figure 1:
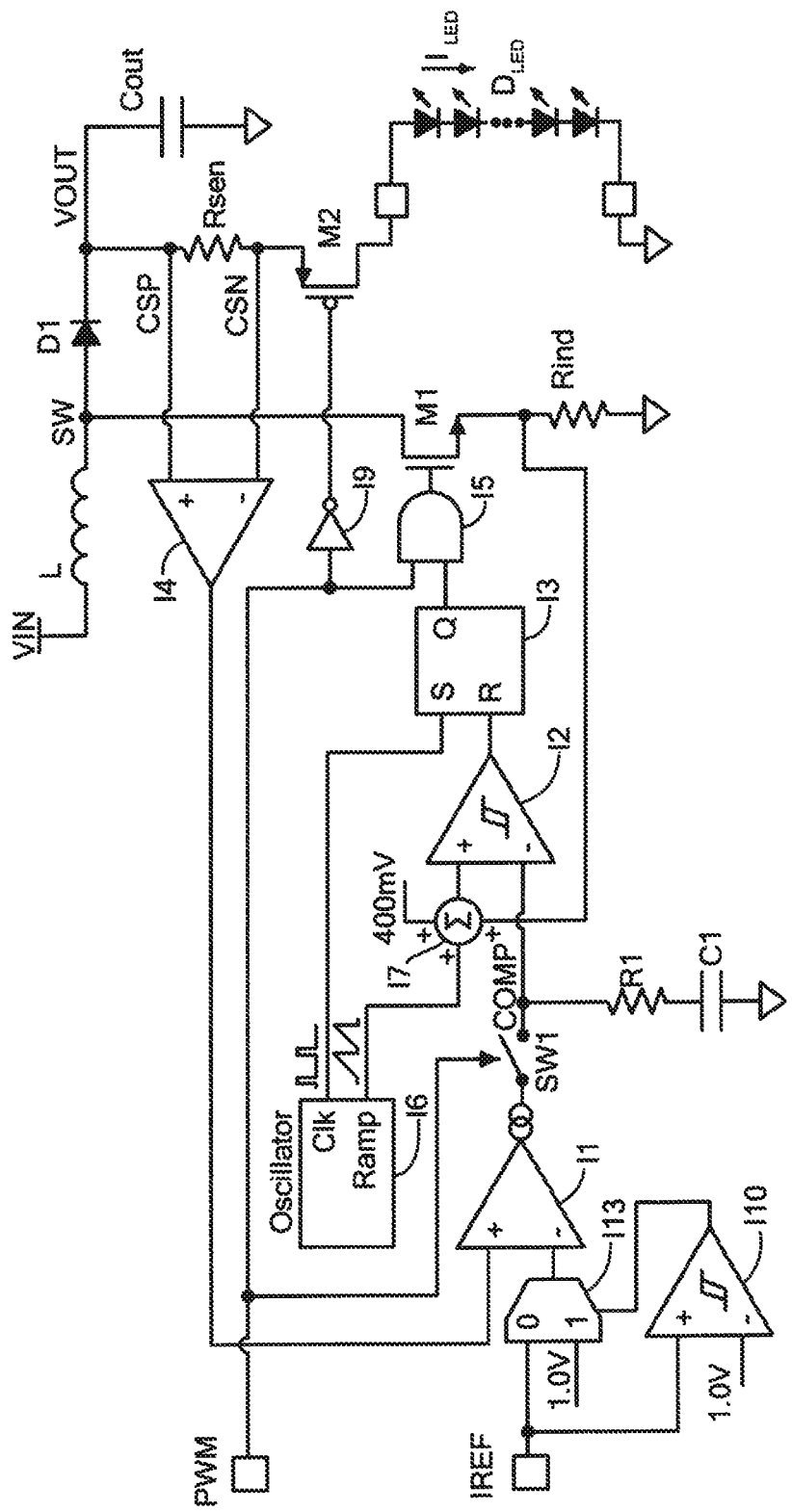
FIG. 1 is a schematic of a conventional switching regulator.
Figure 2:
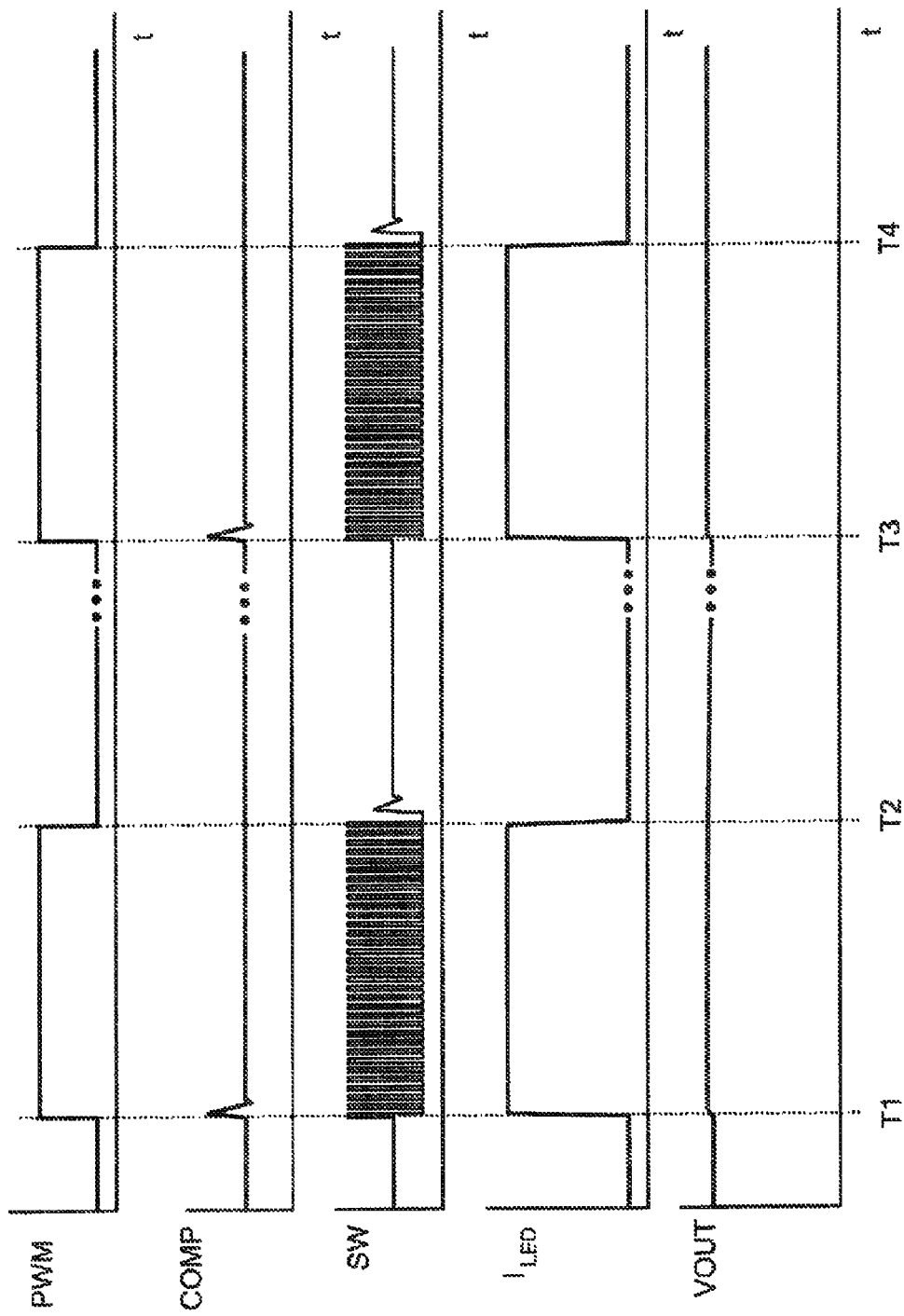
FIG. 2 shows several illustrative waveforms associated with the regulator of FIG. 1.
Figure 3:
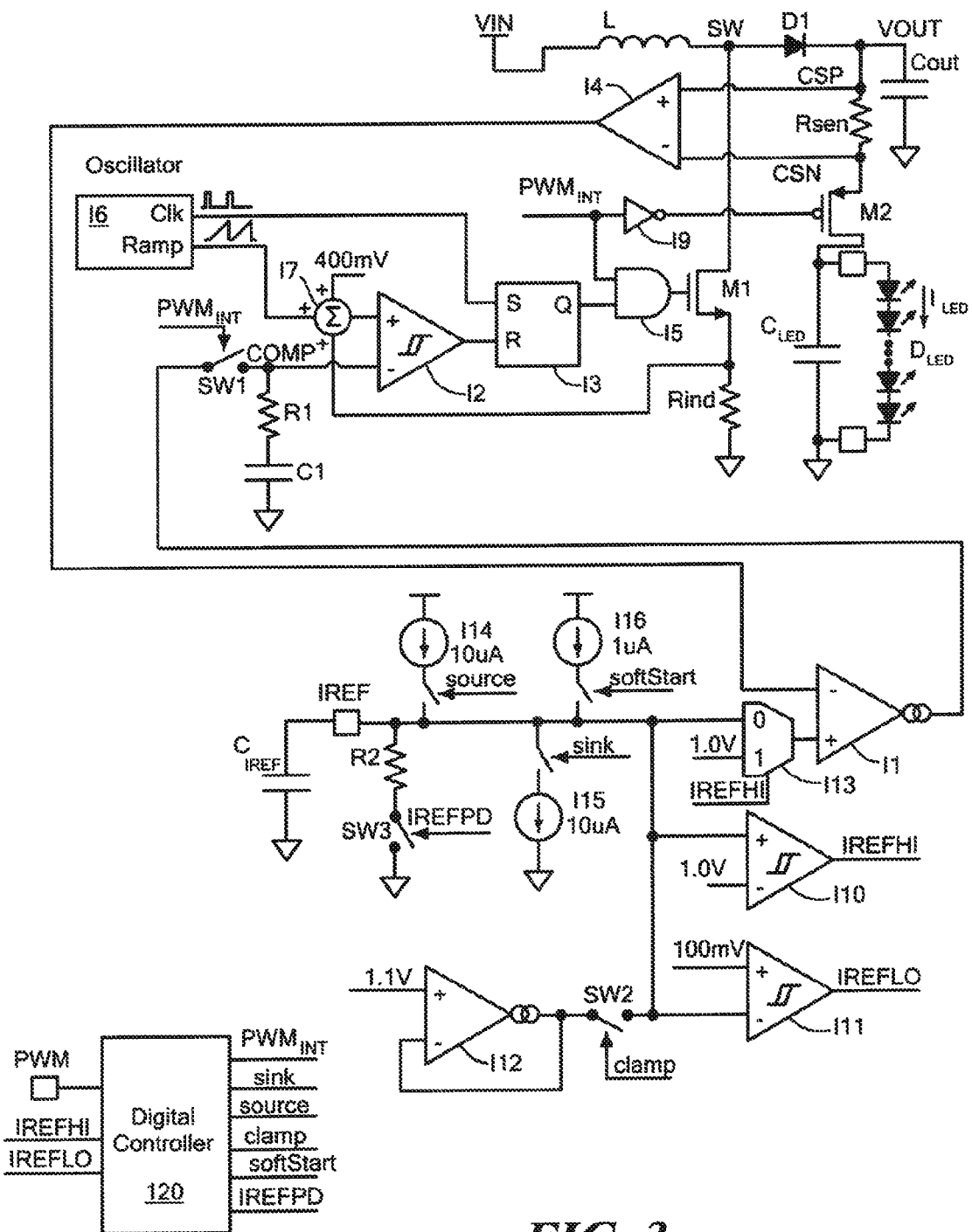
FIG. 3 is a schematic of a switching regulator having a control circuit with a ramp control feature.

Referring to FIG. 3, a switching regulator, including a switch M1 that conducts to transfer energy from an input source VIN to an output at which a regulated output is provided, further includes a circuit configured to generate a control signal to control conduction of the switch M1 and having a first input responsive to a reference signal (e.g., as provided at IREF), a second input responsive to a feedback signal proportional to the regulated output (e.g., as provided by I4), and an output at which the control signal is provided. The IREF reference signal is ramped to control a rate of change (i.e., increase and/or decrease) of the regulated output ($I_{LED}$) to implement a ramp control feature. The regulator control circuit further includes a logic circuit I5 coupled to the output of the circuit to gate the control signal in response to a $PWM_{INT}$ signal.

More particularly, the regulator control circuit includes a current source (I14) and a current sink (I15) coupled to the IREF pin along with an external cap ($C_{IREF}$) to slowly ramp the IREF voltage. The LED current $I_{LED}$ will slowly ramp with the IREF voltage at a rate established by a current source (I14, I16) or current sink (I15) and the value of the capacitor $C_{IREF}$, as will be described. The use of external cap $C_{IREF}$ allows the user to program the ramp rate, typically on the order of 10 u-100 us. In addition to the IREF pin sink and source currents, the regulator also includes a 10%, IREFLO comparator (I11), 110% high impedance driver (I12), IREF pull down (SW3), and digital controller I20 to form the ramp control feature.

Figure 4:
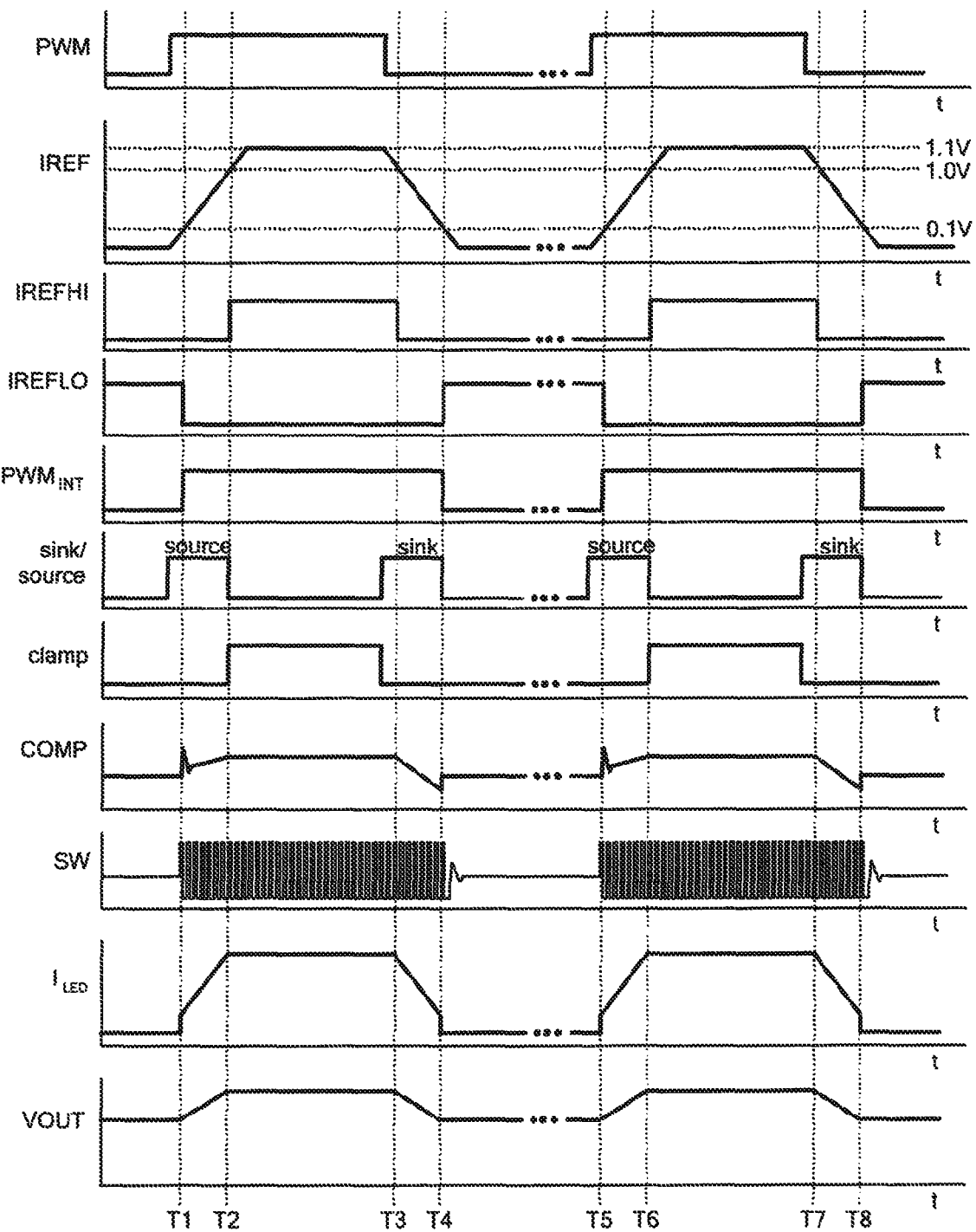
FIG. 4 shows several illustrative waveforms associated with the regulator of FIG. 3.

Referring also to the FIG. 4 which shows illustrative waveforms associated with FIG. 3, the ramp control feature is only active after the rising and falling edges of the PWM input. When the PWM input goes from low to high the IREF pin starts at 0V and ramps up past the internal reference (here of 1.0V) at a rate determined by the IREF capacitance and the source current of source I14 (T1 to T2). As shown the LED current $I_{LED}$ tracks the IREF pin voltage, slowly ramping up with IREF voltage.

When the IREF pin crosses the 1.0V internal reference, the comparator I10 trips (i.e., IREFHI=1) causing the mux I13 to toggle to hand off control from the IREF pin to the internal reference of 1.0V. Through the digital controller, the IREFHI signal also disables the source current I14 with the source signal and activates the 110% driver (I12) with the clamp signal. This prevents IREF from continuing to charge well past the 1.0V reference while ensuring that IREF does not drop below the 1.0V reference. The driver (I12) may be implemented with an OTA connected as a buffer to a 1.1V reference that only has a source and sink capability on the order of 10 uA. This high impendence drive allows the user to easily override the driver, and pull the reference IREF below 1.0V to set an analog dim reference. Note that when the IREF pin is pulled below the IREFHI comparator I10, the 110% driver I12 is disabled with switch SW2. The system may also be designed to detect the analog dim mode of operation and disable the source and sink currents (I14 and I15) to provide better accuracy.

As shown in FIGS. 3 and 4, the $PWN_{INT}$ signal causes the SW operation to resume, LED switch to close (M2), and COMP switch (SW1) to close on the rising edge of $PWM_{INT}$. However, with the addition of the ramp control feature, the LED current only jumps to the 10% level when the LED switch is closed (M2), due to the discharge characteristic, which will be explained in more detail later. As illustrated after SW, COMP, and LED operation are resumed at time T1, the ramp control feature begins to slowly ramp up the IREF pin resulting in a slow ramp up of the LED current ($I_{LED}$), LED voltage (VOUT) and the COMP voltage.

When the PWM input goes from high to low, the clamp is disabled and the IREF pin is discharged with the sink current (I15) starting at the 1.1V reference, and the LED current $I_{LED}$ then begins to ramp down as it tracks the IREF voltage at the 1.0V handoff, as shown in FIG. 4. In the prior art the LED switch (M2) would turnoff immediately with the PWM falling edge, but with the ramp control feature, the LED switch M2 must be closed while the LED current $I_{LED}$ is being ramped down, This delay is implemented by the digital controller (I20) via the $PWM_{INT}$ signal. After the PWM input falling edge, the $PWM_{INT}$ signal remains high until the IREF pin voltage reaches the 10% threshold (i.e., until the IREFLO signal transitions at time T4). Thus, it will be apparent that the $PWM_{INT}$ signal is a delayed version of the signal at the PWM input, where the delay corresponds to the time it takes the voltage at the IREF pin to fall to the 10% threshold (established by comparator I11) on the falling edge of the PWM signal and/or where the delay corresponds to the time it takes the voltage at the IREF pin to exceed the 10% threshold on the rising edge of the PWM signal. On the $PWM_{INT}$ falling edge (T4) the LED switch (M2) is opened, SW operation is halted, and the COMP node is tri-stated with switch SW1. The COMP node is tri-stated to save the control loop operating point while the output is not active so that when operation resumes, the control loop will resume regulation very quickly. In this case the operating point was at the 10% level so operation will also resume at the 10% level.

As discussed and illustrated in FIG. 4, ramp down regulation (i.e., control of the rate of decrease of the LED current $I_{LED}$ via the IREF voltage) is halted when the IREF pin is less than the 10% threshold established by comparator I11. This non-zero threshold is selected because when LED current is ramping down, the system is relying on the LED string to discharge the output capacitor (Cout). As the current gets lower, the ability of the LEDs to discharge the output capacitance is reduced, which may cause the LED current to remain higher than the reference set by the IREF pin. In other words, the regulator in FIG. 3 does not have any current sink capability due to diode D1, and therefore the fastest rate the LEDs can be discharge at is set by Cout and the V-I characteristic of the LEDs ($D_{LED}$). Due to the exponential V-I characteristic of LEDs, the rate that Cout discharges at decreases with current. Therefore, the 10% turnoff threshold is selected so that LEDs still have enough sink capability to approximately track the IREF voltage.

The 10% cutoff is also beneficial for the PWM, input rising edge because the regulator cannot regulate LED current down to extremely low levels due to DCM (discontinuous conduction mode) operation and the SW node min duty cycle limit. For that reason, 10% is also selected as a point where the control loop can easily maintain the LED current. As shown in FIG. 4, it is desirable that the control is resumed at the same level (10%) that it was disabled at. This is because the LED voltage (VOUT) has been discharged to that level, and the COMP node is set to that level. Note that the COMP node has a step response on the $PWM_{INT}$ falling and rising edges due to the zero introduced by R1 in the compensation network. Since COMP is slowing, a voltage is developed across R1 that is eliminated when SW1 opens. When the controller is re-enabled the COMP node exhibits some overshoot to slew the inductor current up to the correct level.

To ensure that the control loop is able to maintain regulation at low IREF pin voltages, it may be desirable to include a light load control technique in the regulator. One light load control technique is pulse skipping which can be implemented by introducing an offset in the current sense signal, as shown in FIG. 3 with 400 mV node on I7. Therefore, when the COMP voltage drops below the 400 mV reference, the SW node will stop switching and resume when the COMP voltage rises above the 400 mV pedestal. This technique along with other light load control techniques, such as pulse frequency modulation, constant on time, etc. are well understood by those skilled in the art.

As illustrated in FIG. 4, the 10% IREFLO threshold results in a small 10% step in the LED current when the LED switch (M2) is open and closed. The small magnitude of this step should not cause significant EMI issues. However, the edge rate can be reduced with the addition of a small capacitor in parallel with the LEDs ($C_{LED}$). This capacitor ($C_{LED}$) should be at least one to several orders of magnitude smaller than the Cout capacitor.

In LED drivers, it is important that the PWM input corresponds directly to the PWM dimming of the LEDs, which is a direct function of the light intensity. In most cases, the IREF ramp is insignificant compared to the LED on time at higher duty cycles, but at low duty cycles meeting this requirement becomes especially difficult and important because the error term is much more significant compared to the LED on time. To meet this requirement with the ramp control feature, the control circuit is designed to provide the area under the curve when ramping up summed with the area when ramping down to be the same area as if the control feature were not present. To achieve this, the IREF pin source and sink currents (I14 and I15) may be identical, and implemented with good relative accuracy. To cancel the delay introduced by the 10% IREFLO feature, the IREF driver (I12) reference is selected to be 10% above the reference handoff point (1.0V). This method relies on the IREF driver (I12) to be accurate relative to the 1.0V internal reference.

Figure 5:
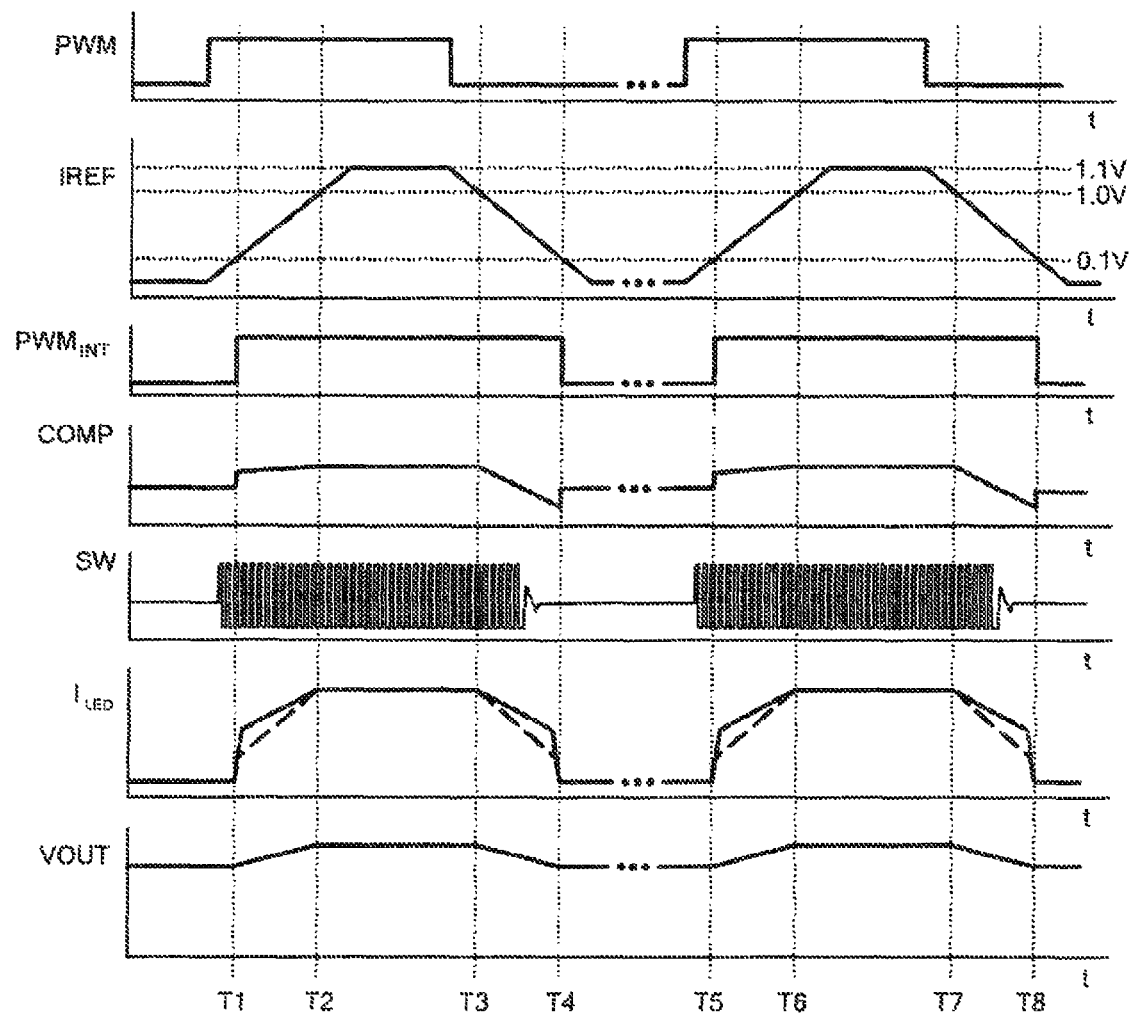
FIG. 5 shows several additional illustrative waveforms associated with the regulator of FIG. 3.

Depending on the crossover frequency set by the compensation network on the COMP pin, the LED current may not exactly track the IREF pin. This is especially true when a fast LED current slew rate is desired or a large output capacitor (Cout) or compensation capacitor (C1) is used. The current sink and source capability of the error amplifier can also impact the ability of the control loop to track the IREF voltage. In the situation when the LED current lags the IREF ramp rate, the IREF pin slew rate should be adjusted until the desired LED current ramp rate is achieved. FIG. 5 illustrates how the system operates with fast LED current slew rates, where the LED current does not exactly track the IREF pin (the expected LED current is shown with dashed lines). As illustrated, the faster ramp and/or slower control loop results in a larger step in the LED current at the $PWM_{INT}$ rising and falling edges.

To improve the tracking of the LED current with fast IREF pin ramp rates, the error amplifier could be altered to provide faster slewing of the COMP pin as may be achieved by increasing the transconductance of the error amplifier while IREFHI=0, which would in turn increase the crossover frequency of the control loop. In addition, the error amplifier source and sink capability could be altered. Large signal control techniques could also be used to slew the COMP pin when the difference between feedback input and the IREF input becomes too large. Similar to this approach would be to simply ramp the COMP pin in an open loop fashion. These methods may be extended even further when using a digital control loop.

To ensure that the ramp control feature is robust against faults and does not negatively impact the analog dim or PWM dim features, a ramp control timeout feature or other similar function may be implemented. A timeout feature may be especially important when IREF is ramping down because the ramp control feature delays the tri-stating of the SW node (forcing off M1) and the opening of the LED switch (M2) until IREF crosses the IREFLO threshold. This delay will result in the PWM input being ignored when the IREF input is driven with a DC signal for analog dimming. A timeout also allows the user to disable the ramp control feature during PWM dimming by driving the IREF pin above the 1.0V reference. This is beneficial if the ramp control feature is not desirable because floating the IREF pin may not fully eliminate the ramp control impact due to the parasitic capacitance on the IREF pin.

Figure 6:
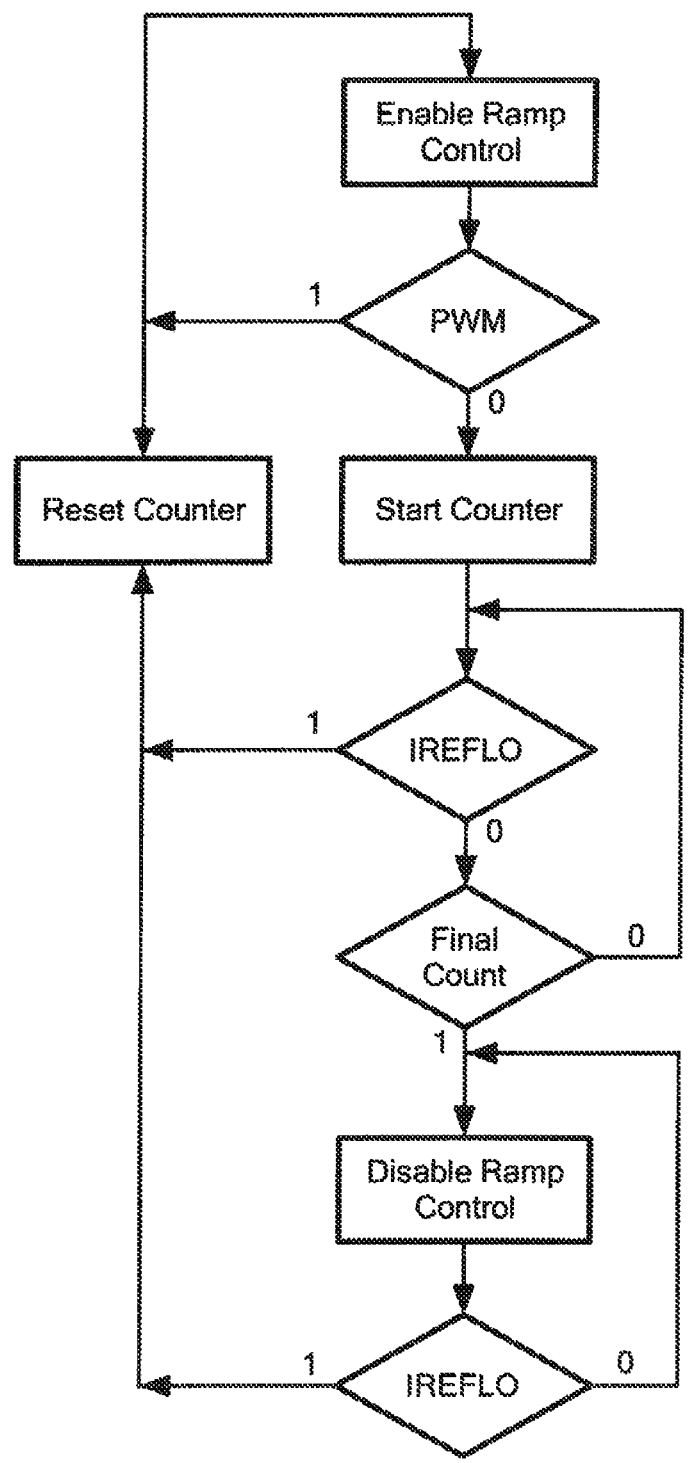
FIG. 6 is a flow diagram showing an illustrative process for timeout of the ramp control feature of FIG. 3.

FIG. 6 details the operation of an illustrative ramp control timeout feature. The ramp control timeout is only monitored on the PWM falling edge, and the timeout timer starts when the PWM input goes low. The timer is reset when IREF crosses the IREFLO threshold (IREFLO=1), and ramp control operation continues as normal. Otherwise if the timer reaches its final count before IREFLO=1 then the ramp control feature is disabled. The feature remains disabled until the IREF signal is driven below the IREFLO threshold. Ramp control operation will resume naturally when the IREF pin is no longer driven externally because the sink current will ramp the IREF pin down when the PWM signal goes low.

It will be appreciated that other circuitry and techniques can be used to disable the ramp control feature. For example, other pins may be used directly to disable the ramp control feature, such as a mode pin or even a serial interface.

During startup and fault conditions, the IREF pin is initialized to a startup state. This is done in FIG. 3 with SW3 and the IREFPD signal that comes from the digital controller I20, to pull down on the IREF pin.

The ramp control architecture lends itself to including a soft start feature, such as the implementation shown in FIG. 3. The reference signal IREF is provided with a first rate of increase (i.e., ramps up at a first rate) established by a current source I16 to implement the soft start feature during a first, soft start time interval and is provided with a second, faster rate of increase established by a current source I14 to implement the ramp control feature during a second time interval. The respective current source control signals (source and soft start) are provided by the digital controller, as shown.

In the illustrated embodiment, the ramp control feature is implemented with 10 uA, sink and source currents (I14 and I15), whereas the soft start ramp is implemented with a 1 uA current source (I16). This results in a soft start ramp that is 10× slower the ramp control rate. Other ratios may be used. Upon startup, during the first time interval, after the UVLO (under voltage lock out) fault clears or any other faults, the IREF pull down (SW3) is released and the 1 uA soft start current (I16) will be used to charge the IREF pin with the ramp control current sources disabled (I14 and I15). During the second time interval, as commences after the IREF pin crosses the IREFHI threshold, the soft start feature will be disabled, and the ramp control driver and current sources will be re-engaged as described above.

FIG. 3 implements the soft start feature by simply ramping the reference of the error amplifier I1. Due to the fact the LEDs will not conduct current until there is a few volts across them, the current sense voltage (CSP-CSN) will remain at zero until VOUT reaches a few volts. As a result, the error amplifier will drive the COMP pin as hard as possible because the 0V current sense voltage (CSP-CSN) is not tracking the soft start ramp. This may result in some overshoot when the LEDs finally do begin to conduct. Fortunately this overshoot will occur at very low LED currents, and at that point the LED current will begin to track the soft start ramp. Other soft start circuits and techniques are also possible. One example is to change the feedback signal of the error amplifier from the current sense amplifier I4 to a resistor divider across VOUT until the LEDs begin to conduct.

Figure 7:
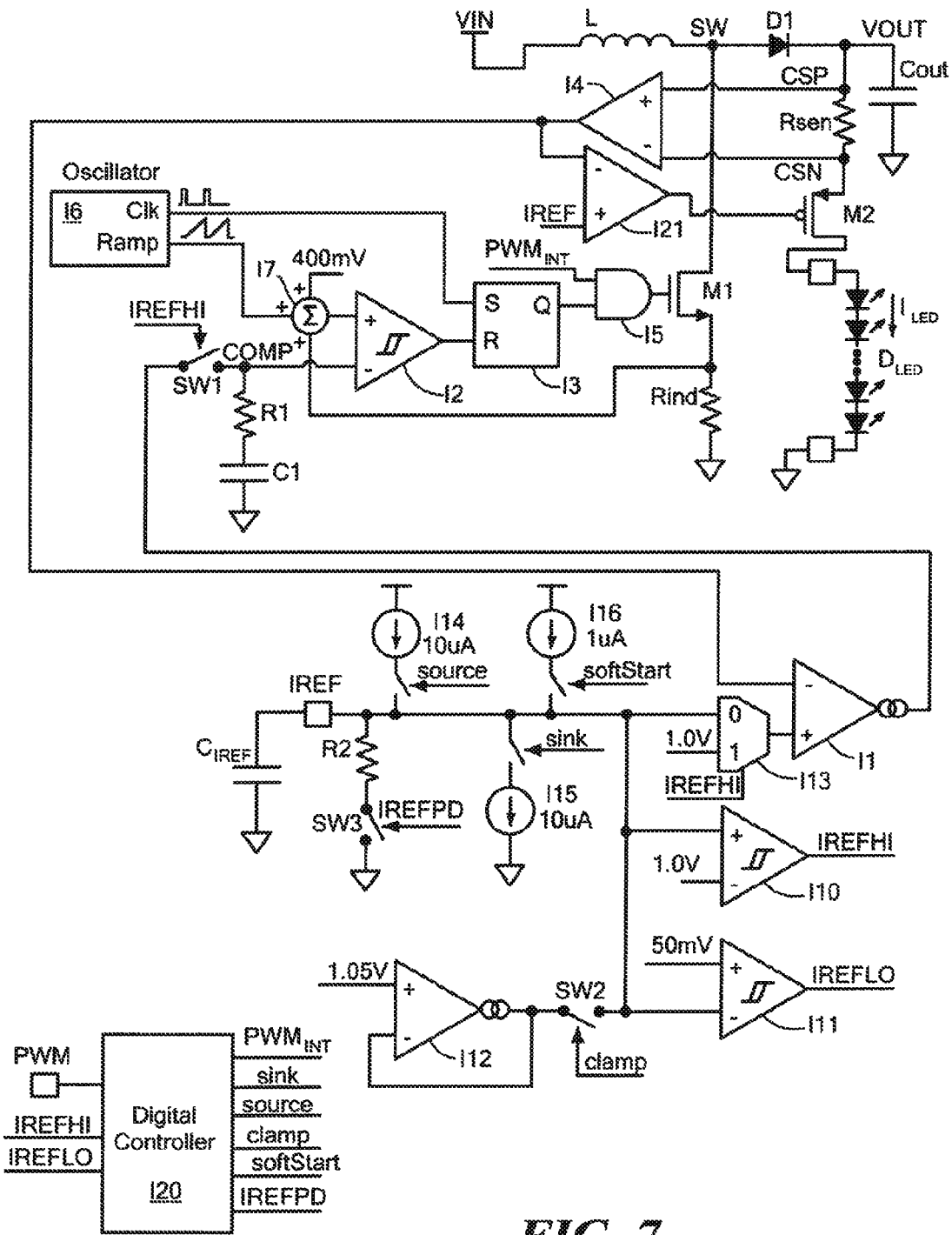
FIG. 7 is a schematic of a switching regulator having a control circuit including an alternative ramp control feature.

The ramp control feature can also be implemented using other circuitry and/or techniques in addition to or in place of the presented circuitry and techniques. One additional technique is illustrated in FIG. 7, which turns the PMOS LED switch (M2) into a linear regulator with the addition of amplifier I21. The reference of the linear regulator (I21 and M2) is the IREF signal. This linear regulator technique does not suffer the limitations of the LED string discharging the output capacitor (Cout) explained earlier because M2 can control the LED current independent of the voltage across Cout. Therefore in FIG. 7 the IREFLO threshold has been changed to 5% (50 mV) to take advantage of this higher performance technique. In addition, the reference for driver I12 has been changed to 105% (1.05V) to properly cancel out the delay. Note that it is still beneficial to have a non-zero IREFLO threshold to be tolerant of errors in the circuitry and relax the design requirements of the linear regulator.

Figure 8:
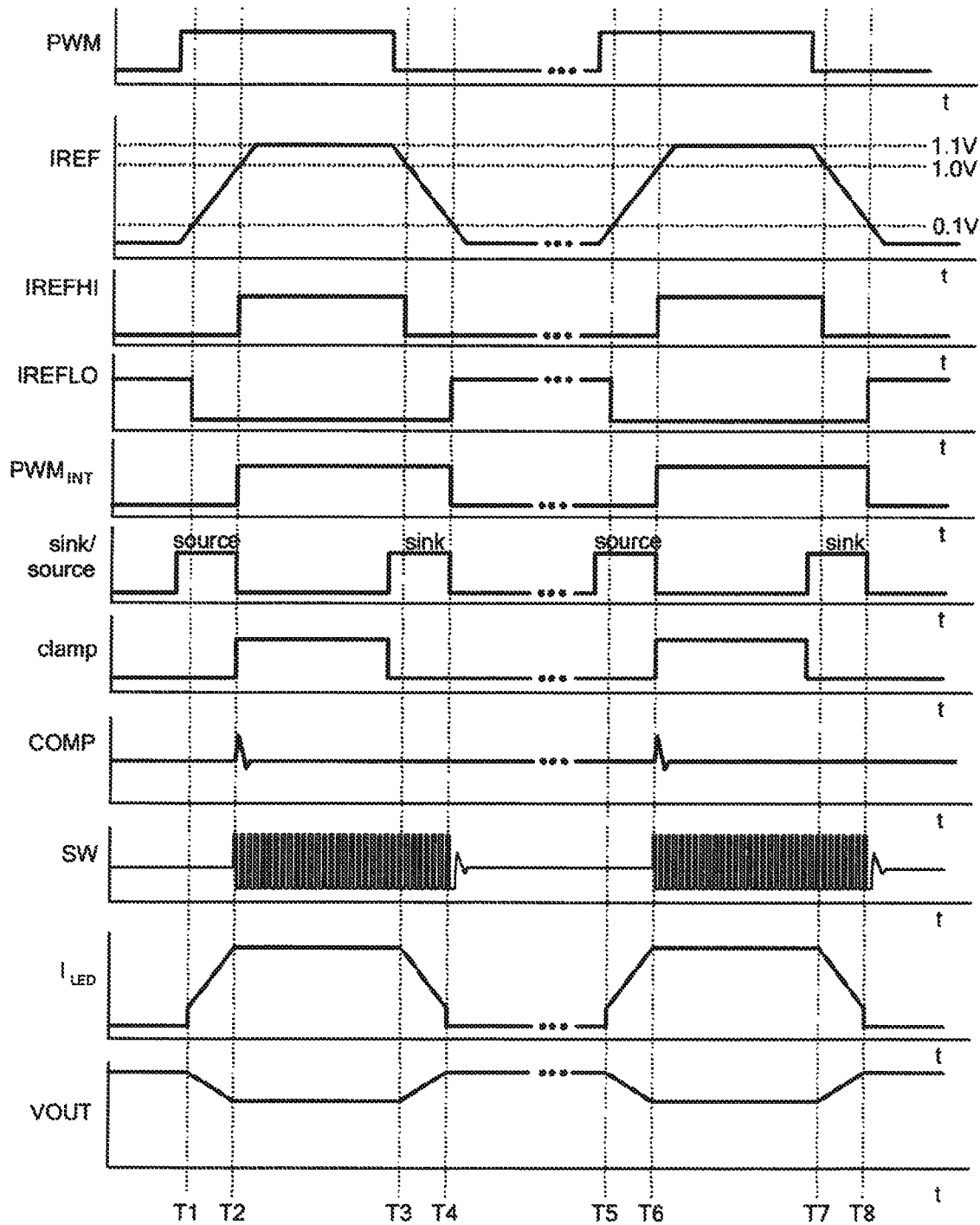
FIG. 8 shows several illustrative waveforms associated with the regulator of FIG. 7.

When adding an additional control loop to regulate the LED current, as done in FIG. 7, it is important that the multiple loops do not negatively interact with one another. In this case, the switching regulator must simply supply enough current to support the current need of linear regulator I21. As shown in FIGS. 7 and 8, this requirement is met by tri-stating COMP pin with the IREFHI signal so that the switching regulator continues to run as if the LEDs were continuing to sink the full regulation current. As a result, when ramping down the LED current, the output voltage (VOUT) will rise up as the output capacitor is charged with the excess current, as illustrated in FIG. 8. Then when the LED current is ramped up, the switching regulator disabled, by shifting the PWM$_{INT}$ signal as shown in FIG. 8, so that excess charge in the output capacitor (Cout) is depleted as the LED current is ramped up. When the IREF voltage crosses the 1.0V handoff point, the linear regulator will naturally drive the LED switch (M2) into the triode region because the switching regulator will take over regulation by supplying less current than demanded by the linear regulator.

To ensure the design is robust against errors, it may be beneficial to add an offset between the error amplifier (I1) reference and the linear regulator to ensure the switching regulator provides enough current for all cases. Other techniques may also be used to ensure the switching regulator provides enough current to the linear regulator, such as multiplexing the error amplifier feedback from the current sense amplifier (I4) to a resistor divider monitoring the output voltage to regulator VOUT at a level just above the regulation point.

All references cited herein are hereby incorporated herein by reference in their entirety.

Having described preferred embodiments, it will now become apparent to one of ordinary skill in the art that other embodiments incorporating their concepts may be used. It will be appreciated that the proposed ramp control circuitry and techniques can be applied any linear or switching regulator topology including but not limited to Buck, Boost, Buck-Boost, SEPIC, Cúk, half-bridge, full bridge, and linear regulators. Furthermore the described circuitry and techniques are not limited to mixed signal systems but can be applied using digital, analog, or software methods, such as a digital to analog converter or charge pump to replace the current sources and external capacitor on the IREF pin. The rate of the IREF pin could be defined by other parameters such as input voltage, output voltage, light intensity, or any other fixed or variable parameter. The ramp up and down characteristic does not need to be linear; for example, it can have an exponential characteristic or even a discontinuity in the shape if desired. The described circuitry and techniques can be implemented with any control loop including current mode control (as discussed and illustrated), voltage mode control, constant on time control, constant off time control, or any over analog and/or digital control scheme. In addition, the proposed circuitry and techniques are not limited to application in regulators that regulate current, and can be applied to regulators that instead regulate voltage, power, or other parameter. Furthermore, it will be appreciated that a regulator of the type described herein may operate in different dimming modes in conjunction and/or in addition to the dimming described herein that utilizes the ramp control feature.

It is felt therefore that these embodiments should not be limited to disclosed embodiments, but rather should be limited only by the spirit and scope of the appended claims.

What is claimed is:

1. A switching regulator control circuit for controlling a switching regulator comprising a switch that conducts to transfer energy from an input source to an output at which a regulated output is provided to an LED load, the switching regulator control circuit comprising:
   a circuit configured to generate a control signal to control conduction of the switch and having a first input responsive to a reference signal, a second input responsive to a feedback signal proportional to the regulated output, and an output at which the control signal is provided, wherein the reference signal is ramped to control a rate of change of the regulated output; and
   a logic circuit coupled to receive the control signal at the output of the circuit and configured to selectively couple the control signal to the switch in response to a PWM signal in order to dim the LED load, wherein the reference signal is ramped in response to an edge of the PWM signal, wherein the regulated output is a current and the reference signal is ramped down to control a rate of decrease of the regulated output and wherein the PWM signal is a delayed version of an external digital signal.

2. The switching regulator control circuit of claim 1 wherein the reference signal is ramped at a rate established in part by a capacitor.

3. The switching regulator control circuit of claim 1 wherein the reference signal is ramped at a user programmable rate.

4. The switching regulator control circuit of claim 3 wherein the reference signal is ramped in accordance with a user selected capacitance.

5. The switching regulator control circuit of claim 1 wherein the reference signal is provided with a first rate of increase established by a first current source during a first, soft start time interval and is provided with a second, faster rate of increase established by a second current source during a second time interval.

6. In a switching regulator adapted to provide an LED current to drive an LED and comprising a switch, a method of dimming the LED comprising: generating a control signal to control conduction of the switch in response to a reference signal and a feedback signal proportional to the LED current; selectively coupling the control signal to the switch in response to a PWM signal in the form of a delayed version of an external digital signal to a switch to turn the switch on in response to an associated one of a rising edge and a falling edge of the PWM signal and to turn the switch off in response to the other one of the rising edge and the falling edge of the PWM signal; and ramping down the LED current reference signal in response to the one of the rising edge or the falling edge of the PWM signal associated with turning the switch off to control a rate of decrease of the LED current.

7. The method of claim 6 wherein controlling the rate of decrease of ramping down the LED current comprises delaying turning off a second switch coupled in series with the LED for a time interval following the one of the rising edge or the falling edge of the PWM signal.

8. The method of claim 7 further comprising providing a second control signal to the second switch to operate the second switch as a linear regulator.

9. The method of claim 6 wherein the LED current is ramped down at a user programmable rate.

10. The method of claim 9 wherein the rate at which the LED current is ramped down is selectable in accordance with selection of a capacitance.

11. The method of claim 6 further comprising stopping ramping down the LED current in response to a timeout condition.

12. The method of claim 6 wherein the timeout condition comprises a reference signal falling to below a predetermined voltage level.

13. A switching regulator control circuit for controlling a switching regulator comprising a switch that conducts to transfer energy from an input source to an output at which a regulated output is provided to an LED load, the switching regulator control circuit comprising:
   a circuit configured to generate a control signal to control conduction of the switch and having a first input responsive to a reference signal, a second input responsive to a feedback signal proportional to the regulated output, and an output at which the control signal is provided, wherein the reference signal is coupled to a current source and to a current sink; and
   a logic circuit coupled to receive the control signal at the output of the circuit and configured to selectively couple the control signal to the switch in response to a PWM signal in order to dim the LED load, wherein the current source and the current sink are controlled by the PWM signal, wherein the PWM signal is a delayed version of an external digital signal.

* * * * *

UNITED STATES PATENT AND TRADEMARK OFFICE
CERTIFICATE OF CORRECTION

| | | |
|---|---|---|
| PATENT NO. | : 9,774,257 B2 | Page 1 of 1 |
| APPLICATION NO. | : 14/620656 | |
| DATED | : September 26, 2017 | |
| INVENTOR(S) | : Joshua Wibben et al. | |

It is certified that error appears in the above-identified patent and that said Letters Patent is hereby corrected as shown below:

In the Specification

Column 5, Line 22, delete "discharge" and replace with --discharged--

Column 5, Line 40, delete "slowing" and replace with --slewing--

Column 6, Line 25, delete "TREF" and replace with --IREF--

Signed and Sealed this
Eighth Day of May, 2018

Andrei Iancu
*Director of the United States Patent and Trademark Office*